United States Patent
Acton et al.

(10) Patent No.: US 7,359,898 B1
(45) Date of Patent: Apr. 15, 2008

(54) SCORING MECHANISM SELECTION ALONG MULTIPLE DIMENSIONS

(75) Inventors: Brian Acton, Saratoga, CA (US); Brian Stolte, San Francisco, CA (US); Rob Solomon, Menlo Park, CA (US); Jeff Weiner, Palo Alto, CA (US); Catherine Cadogan, Santa Clara, CA (US); Matt Heist, San Carlos, CA (US); Manish Baldua, San Jose, CA (US); Charles Arendt, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 791 days.

(21) Appl. No.: 10/789,839

(22) Filed: Feb. 26, 2004

(51) Int. Cl.
*G06F 17/30* (2006.01)
*G06F 15/16* (2006.01)

(52) U.S. Cl. .................. 707/5; 707/3; 707/4; 707/100; 713/400

(58) Field of Classification Search .............. 707/3, 707/4, 5, 100; 713/400
See application file for complete search history.

(56) References Cited

U.S. PATENT DOCUMENTS

| | | | |
|---|---|---|---|
| 5,815,689 A * | 9/1998 | Shaw et al. ............... 713/400 |
| 6,412,012 B1 | 6/2002 | Bieganski et al. | |
| 6,697,799 B1 | 2/2004 | Neal et al. | |
| 6,785,671 B1 | 8/2004 | Bailey et al. | |
| 7,082,426 B2 | 7/2006 | Musgrove et al. | |
| 7,086,002 B2 | 8/2006 | Elo et al. | |
| 7,117,207 B1 * | 10/2006 | Kerschberg et al. ........... 707/5 |
| 2002/0062258 A1 | 5/2002 | Bailey et al. | |
| 2004/0093331 A1 * | 5/2004 | Garner et al. .................. 707/3 |
| 2004/0193591 A1 | 9/2004 | Winter | |
| 2004/0249831 A1 * | 12/2004 | Fagin et al. ................. 707/100 |
| 2005/0149390 A1 | 7/2005 | Scholl et al. | |
| 2006/0184430 A1 | 8/2006 | Gavarini | |
| 2006/0282339 A1 | 12/2006 | Musgrove et al. | |
| 2007/0022021 A1 | 1/2007 | Walker et al. | |

OTHER PUBLICATIONS

David D. Lewis. "Naive (Bayes) at forty: The independence assumption in information retrieval". In Claire N'edellec and C'eline Rouveirol, editors, Proceedings of ECML-98, 10th European Conference on Machine Learning, No. 1398, pp. 4-15, Chemnitz, DE, 1998. Springer Verlag, Heidelberg, DE.

* cited by examiner

*Primary Examiner*—Tony Mahmoudi
(74) *Attorney, Agent, or Firm*—Hickman Palermo Truong & Becker LLP

(57) ABSTRACT

Techniques for selecting a scoring mechanism from a plurality scoring mechanisms for processing queries are provided. The techniques comprise the steps of, for each scoring mechanism of multiple scoring mechanisms, determining, based on a query, multiple parameter values for the scoring mechanism, generating a score based on the multiple parameter values determined for the scoring mechanism, and selecting which scoring mechanism to use to process the query based on the score generated for each scoring system.

18 Claims, 5 Drawing Sheets

SCORING MECHANISM SELECTION ALONG MULTIPLE DIMENSIONS

RELATED APPLICATIONS AND PRIORITY CLAIM

This patent application is related to U.S. patent application Ser. No. 10/788,537, filed on Feb. 26, 2004, entitled "Associating Product Offerings with Product Abstractions" naming Brian Acton, Brian Stolte, Rob Solomon, Jeff Weiner, Catherine Cadogan, Matt Heist, Manish Baldua, and Charles Arendt as inventors, the entire contents of these prior applications are hereby incorporated by reference in their entirety for all purposes.

This patent application is related to U.S. patent application Ser. No. 10/789,837, filed on Feb. 26, 2004, entitled "Product Data Classification" naming Brian Acton, Brian Stolte, Rob Solomon, Jeff Weiner, Catherine Cadogan, Matt Heist, Manish Baldua, and Charles Arendt as inventors, the entire contents of these prior applications are hereby incorporated by reference in their entirety for all purposes.

FIELD OF THE INVENTION

The present invention relates to query processing. The invention specifically relates to selecting a scoring mechanism from a plurality scoring mechanisms for processing queries.

BACKGROUND OF THE INVENTION

A product search mechanism is a mechanism that, in response to a user query, provides search results that identify one or more products that are selected based on the query. A user query is typically a Boolean logic phrase contained in a string.

Product search mechanisms are often associated with specific websites. For example, a website may provide to a user's browser a web page that includes a field for specifying a query. The user enters a query into the field, and then selects a control that causes the query to be transmitted back to a product search mechanism associated with the website. The product search mechanism then processes the query, and sends a web page that contains the search results back to the user's browser.

In product search mechanisms, results are generated by query processing engines. Query processing engines generally include one or more scoring mechanisms. A scoring mechanism is a mechanism that employs a particular algorithm for finding matching results for a user query from among a pool of candidate results. The act of using a scoring mechanism to determine the search results for a query is referred to herein as "scoring the query" with the scoring mechanism.

Different scoring mechanisms may use different techniques for determining how to score a query. The algorithm used by a scoring mechanism may, for example, select the matching results based on a comparison between key words in the query and key words in product descriptions. Such a scoring mechanism is referred to herein as a "keyword-matching" scoring mechanism.

For example, consider a keyword-matching scoring mechanism used by a product search engine. A user may want to find all products that have the words "Hess AND Siddhartha AND book". The keyword-matching scoring mechanism would search the product database and, by comparing the keys words in the query against key words in product descriptions, provide a result containing a reference to a copy of Herman Hess' book "Siddhartha".

Some systems use a single scoring mechanism for scoring a user query, as was the case for the example above. A problem with this approach is that a single scoring mechanism may not produce acceptable results for all user queries. For example, if a system uses only a keyword-matching scoring mechanism, then the results for some product searches may be acceptable, such as the Siddhartha search described above. However, other searches for other products may not produce acceptable results, such as a search for a laptop based on the query: "laptop AND 2.3 GHz AND nVidia". Using a keyword-matching scoring mechanism, a laptop with a 2.4 GHz processor with an nVidia graphics card would not be selected by the scoring mechanism as one of the results.

Another type of scoring mechanism is a Bayesian scoring mechanism. Bayesian scoring mechanisms use Bayesian classifiers, which are neural networks trained on sample data. The sample data contains sample user queries and appropriate result sets for those queries. After training on the sample data, a Bayesian classifier provides an estimate of how likely a given candidate item from the pool of product information is to match a user query.

Another approach to producing results for a user query is to (1) use multiple Bayesian scoring mechanisms in the system, (2) determine the "relevance" of the search results produced by each scoring mechanism, and (3) provide to the user that submitted the query the results from the scoring mechanism with the maximum relevance for that query. The relevance for a Bayesian scoring mechanism is determined as a functional composition of the likelihood that each result in the set of results produced by the scoring mechanism matches the user query.

In the relevance maximization approach, the search results will often include only unsponsored candidate items, where an unsponsored item is one for which no party associated with an item is charged a fee for inclusion of the item in a result set. This approach aides the user, because the user receives the most relevant result set from among those generated by the multiple scoring mechanisms. However, such an approach does not take into consideration the revenue generation needs of the company providing the search results. A result set maximizing the relevance and exclusively consisting of unsponsored links generates no revenue.

Even if sponsored results are considered during the scoring process, the relevance maximization approach still has a problem in that it leads to a sacrifice of generated revenue in order to maximize relevance of the search results. For example, consider the choice between two scoring mechanisms: scoring mechanism A which has a relevance score, using some relevance scoring system, of 85% and potential revenue of $20 and a scoring mechanism B which has a relevance score of 86% and a potential revenue of $1. Using this approach would cause the search provider to forego $19 while providing the customer with only marginally better search results.

Another approach to producing results for a user query is the revenue maximization approach. This approach uses multiple scoring mechanisms for each user query and selects the one for which the maximum revenue would be generated given its produced result set. Such an approach aides the search provider by providing revenue for the service it provides, but has a problem in that it leads to a sacrifice of relevance of the result set to the user query. For example, consider the choice between two scoring mechanisms: scoring mechanism A which has a relevance score of 85% and potential revenue of $20 and a scoring mechanism B which has a relevance score of 12% and a potential revenue of $21. Simply maximizing on revenue would cause the search provider to choose to use a scoring mechanism with very low relevance over a scoring mechanism with high relevance in order to make $1 more.

Clearly, there is a need for techniques that select from multiple scoring mechanisms but still avoid choosing a scoring mechanism based on a single parameter value.

The approaches described in this section are approaches that may be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
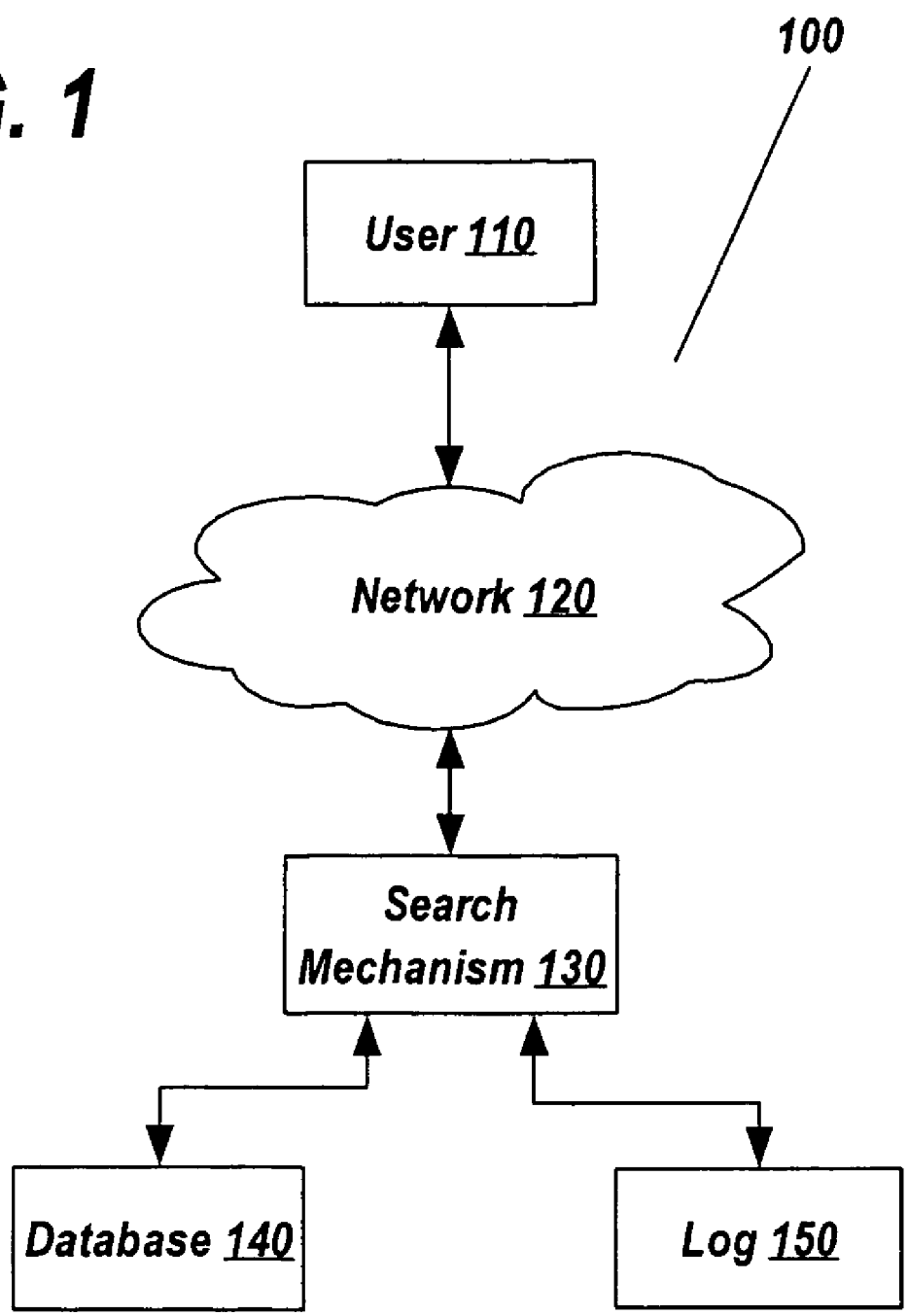
FIG. 1 is a block diagram that depicts example architectural components and layout for a system for providing search results according to one embodiment of the invention

Techniques for selecting a scoring mechanism from a plurality scoring mechanisms for processing queries are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for picking a particular scoring mechanism from a plurality of scoring mechanisms for a particular query. Consider a search mechanism that has multiple scoring mechanisms at its disposal—each implemented as a separate subroutine in the search mechanism. Depending on the query that comes in, different scoring mechanisms may produce better results than the others. The techniques described hereafter determine which of a plurality of scoring mechanisms will produce the "best" results for a particular query, where "best" is determined by a variety of factors.

Definitions

The following terms shall be used hereafter to describe embodiments of the invention:

Scoring mechanism: any technique to produce query results based on a user query.

Product offering: an offer to sell a particular product by a particular party.

Product abstraction: abstract representations of a product.

Product item: any product-related item about which a user may want to perform a search. E.g. a merchant, product offering, or product abstraction.

Sponsored product item: a product item for which a party associated with the particular product item will or has been charged a fee for each inclusion of the particular product item in results provided by the search mechanism.

User retention for a scoring mechanism: likelihood that a user that issued a query will find the results from the scoring mechanism useful.

Identifying Better Results

In order to produce "better results", the search mechanism determines parameter values for each scoring mechanism, given the query submitted by the user. For example, the search mechanism may determine, for each scoring mechanism, a percentage of sponsored product items in the result sets, a user retention parameter value, and a relevance of results produced parameter value. The search mechanism performs a functional composition of the parameter values in order to determine, for the particular query at issue, which scoring mechanisms will produce the best results.

Consider this example, a search mechanism chooses among three scoring mechanisms, A, B, and C for processing a query for a copy for Herman Hess' book "Siddhartha" ("Siddhartha query"). The search mechanism determines the parameter values for relevance, percentage of sponsored product items, and user retention for each of the three scoring mechanisms. For the purpose of illustration, it shall be assumed that each scoring mechanism has a strong point. Specifically, scoring mechanism A has a relevance score of 90%, a percentage of sponsored product items of 60%, and a user retention value of 50%. Scoring mechanism B has a relevance score of 60%, a percentage of sponsored product items of 70%, and a user retention value of 90%. Scoring mechanism C has a relevance score of 50%, a percentage of sponsored product items of 90%, and a user retention value of 70%. Depending on the functional composition used, any among these scoring mechanisms may have the highest total score and thereby be chosen. In this example, the product of the parameter values is calculated and scoring mechanism B has the highest score (378,000) followed by C (315,000) and A (270,000). Therefore, scoring mechanism B is chosen to provide results to the user who submitted the Siddhartha query.

System Overview

FIG. 1 is a block diagram that depicts example architectural components and layout for a system for providing search results according to one embodiment of the invention. Techniques are described hereafter for selecting a scoring mechanism from a plurality of scoring mechanisms based on multiple dimensions. These techniques enable a broader system which may include, but neither must include nor is limited to the following components:

one or more users 110, communicatively coupled to a network 120, that submit queries to a search mechanism 130 and receive results based on those queries;

the network 120 for coupling the users 110 and the search mechanism 130;

the search mechanism 130 for selecting a scoring mechanism from a plurality of scoring mechanisms based on multiple dimensions;

a database 140, communicatively coupled to the search mechanism 130, for storing information related to the multiple scoring mechanisms and the products which the users are searching; and a log 150, communicatively coupled to the search mechanism 130, for storing information related to the execution of the search mechanism and selection of scoring mechanisms.

In a system 100, users 110 submit queries to a search mechanism 130 over a network. Users 110 may be human users, automated processes, or any other appropriate users. The network 120 may be a wireless network, dial up access, the Internet, a local area network (LAN), or any another appropriate communication network. The search mechanism 130 may be a process running on one or more processors on a single computer, multiple processes running on one or more processors on a single computer, or multiple processes running on two or more computers. The users may submit their queries using file transport protocol (FTP), hypertext transport protocol (HTTP), secure HTTP (HTTPS), rsync, or another data transport protocol which is able to deliver data to the search mechanism. Any appropriate query type may be used, including Boolean queries and keyword searches. The queries may be submitted using any appropriate format, including Hypertext Markup Language (HTML), Extensible Markup Language (XML), character-delimited format, or fixed-column-width formats.

The search mechanism 130 processes the query and provides results from a particular scoring mechanism. The particular scoring mechanism used to produce the results may be selected based on parameter values generated, based on the query, for multiple candidate scoring mechanisms. The techniques for doing this are described in greater detail in the Functional Overview.

The search mechanism 130, in generating results for a user 110 query, obtains, from the database 140, information related to the candidate scoring mechanisms, such as the user retention values for each scoring mechanism. In this example, the database 140 is a relational database. The database 140 may also be a flat file, Lightweight Directory Access Protocol (LDAP) directory, or another appropriate storage mechanism.

While generating results for a query, the search mechanism 130 stores information related to result generation in a log file 150. This stored information may include a record of which scoring mechanism was picked to provide results for which user 110. The log file is a flat file, but may also be a relational database, a directory service, a LDAP directory, or another appropriate storage mechanism. In other embodiments, a single database 140 or log file 150 may perform the functions herein performed by the separate database 140 and log file 150.

Functional Overview

One of the operations performed by the system described herein is choosing a scoring mechanism, from among multiple candidate scoring mechanisms, based on a query submitted by a user 110.

Figure 2:
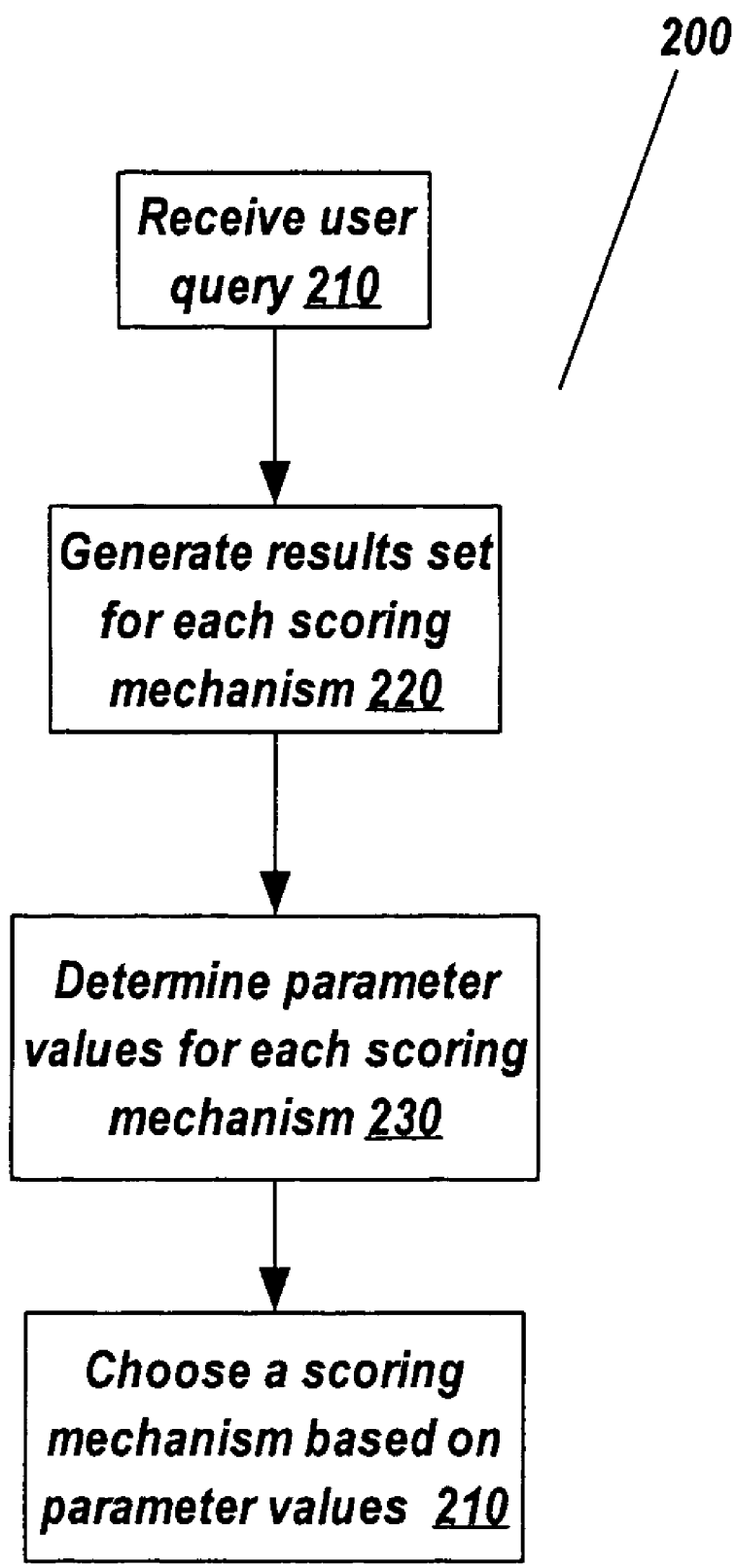
FIG. 2 is a flow diagram that illustrates a process for choosing a scoring mechanism based on a user query.

FIG. 2 is a flow diagram that illustrates a process for choosing a scoring mechanism from among a plurality of scoring mechanisms based on a user query. Referring to FIG. 2, a user query is received in step 210. For example, a user 110 submits the Siddhartha query via HTTP in HTML by typing the query into a webpage provided by the website associated with the search mechanism 130. As noted above, the query may be submitted in any appropriate format via any appropriate communication means.

After receiving a user query in step 210, candidate search results are generated for each of a plurality of scoring mechanisms in step 220. For example, the search mechanism 130 generates results for the Siddhartha query for both scoring mechanism A and scoring mechanism B. Results will generally consist of a set of links to one or more product items. The results may include XML, HTML, or other appropriate links to any product item for which a user may want to search.

According to one embodiment, the results for each scoring mechanism are generated by searching for matching query results in the database 140 using the matching algorithm associated with the scoring mechanism. The techniques for searching for matching items is based on the scoring mechanism being used, and may include key word matching, Bayesian classification, and/or matching based on product identifiers, such as Universal Product Code (UPC), International Standard Book Number (ISBN), manufacturer, manufacturer's part number, model number, or other appropriate identifiers. Bayesian classifiers are trained neural networks that provide an estimate for the likelihood that a particular product offering satisfies a query. More details about Bayesian classifiers may be found in David D. Lewis. "Naive (Bayes) at forty: The independence assumption in information retrieval". In Claire N'edellec and C'eline Rouveirol, editors, Proceedings of ECML-98, 10th European Conference on Machine Learning, number 1398, pages 4-15, Chemnitz, D E, 1998. Springer Verlag, Heidelberg, D E.

In step 230, for each scoring mechanism of the plurality of scoring mechanisms, multiple parameter values are generated. Some or all of the parameter values that are generated for each scoring mechanism may be based on the search results that the scoring mechanism would provide for the particular user query. For example, (1) a relevance score, (2) a percentage of sponsored product items score, and (3) a user retention score are generated for each of scoring mechanisms A, B, and C based on the results that the scoring mechanism would generate for the Siddhartha query. Other parameter values may also be used. Examples of how each of these parameters may be calculated shall be given hereafter.

After determining parameter values for each scoring mechanism in step 230, a scoring mechanism is chosen based on those parameter values (step 240). In one embodiment, the choice of scoring mechanism is based on the product of the multiple parameter values. For example, consider the example of scoring mechanisms A, B, and C with parameter values described in General Overview. Multiplying the parameter values for each scoring mechanism together, we determine that scoring mechanism B has the highest score and therefore choose scoring mechanism B. The determination of which scoring mechanism to choose may also be based on performing any appropriate mathematical functions on the parameter values, including a sum of parameter values; a product of squares of parameter values; a sum of squares of the parameter values; or a polynomial composition of the parameter values.

In the example given above, a single scoring mechanism is selected for providing results to the query. However, in alternative embodiment, a subset of the scoring mechanisms may be chosen, where the search result returned to the user include a mixture of some or all of the results of each of the selected scoring mechanisms.

The process described herein for choosing a scoring mechanism from among a plurality of scoring mechanisms based on a user query enables, among other things, a search mechanism to produce results that balance many aspects, represented by parameter values, of various scoring mechanisms in order to pick the best among them.

Determining Relevance of Scoring Mechanism

As mentioned above, a relevance parameter is one of the parameters that may be used in selecting which scoring mechanism to use to process a query. The relevance parameter value may be determined for each scoring mechanism in a variety of ways. For example, according to one embodiment, the relevance parameter value is determined for each scoring mechanism by having a human operator grade the results produced by each scoring mechanism for one or more sample queries. For example, after inspecting the search results produced by scoring mechanisms A, B and C for fifty sample queries, a human operator may assign scoring mechanisms A, B, and C relevance scores of 90, 53 and 82, respectively.

The grading by human operators may also be done for each of the scoring mechanisms for each of multiple product item categories. The grades compiled from one or more human operators are compiled and produce a score for the scoring mechanism for each of one or more product item categories. For example, rather than have a single relevance score (e.g. 90) for scoring mechanism A, scoring mechanism A may have a relevance score of 70 for queries relating to product category X, a relevance score of 98 for queries relating product category Y, and a relevance score of 82 for queries relating to product category Z.

The relevance parameter may also be generated automatically. For example, relevance for a scoring mechanism may be determined on a predefined training dataset including training queries, corresponding training result sets for the training queries, and a training product database from which the scoring mechanism chooses results. The relevance for the scoring mechanism may then be determined as a function of the number of correct and incorrect results that the scoring mechanism selected from the training product database (i.e. the relevance parameter value is determined by looking at the overlap between the result set the scoring mechanism generates for the training query and the training result set corresponding to the training query).

Determining Density of Sponsored Products of Scoring Mechanism

As mentioned above, a density of sponsored product items parameter is one of the parameters that may be used in selecting which scoring mechanism to use to process a query. The density of sponsored product items parameter value may be determined for each scoring mechanism in a variety of ways. For example, according to one embodiment, the density of sponsored product items parameter value may be generated for a scoring mechanism based on the percentage of sponsored product items within results that would be produced by using the scoring mechanism to process the query. The density of sponsored product items parameter value may also be based on potential revenue (e.g. total dollars charged to sponsors for inclusion of their product items) for the result set generated by each scoring mechanism of said plurality of scoring mechanisms. Any other appropriate density of sponsored product items algorithm may also be used.

Determining User Retention Parameter for Scoring Mechanism

As mentioned above, a user retention parameter is one of the parameters that may be used in selecting which scoring mechanism to use to process a query. The user retention parameter value may be determined for each scoring mechanism in a variety of ways. For example, according to one embodiment, the user retention parameter value is based on estimates of the likelihood that a user that issued a query will find the results useful. It may be calculated as the percentage of users that return to a website associated with a scoring mechanism within a predetermined time span after receiving results generated by the scoring mechanism. Details of two methods for determining user retention are discussed hereafter.

Determining User Retention Based on Cookies

One of the parameter values on which selection of a scoring mechanism from among multiple candidate scoring mechanisms may be made is user retention. There are general methods described herein for determining user retention. The first uses Internet browser cookies and the other is based on user history.

Figure 3:
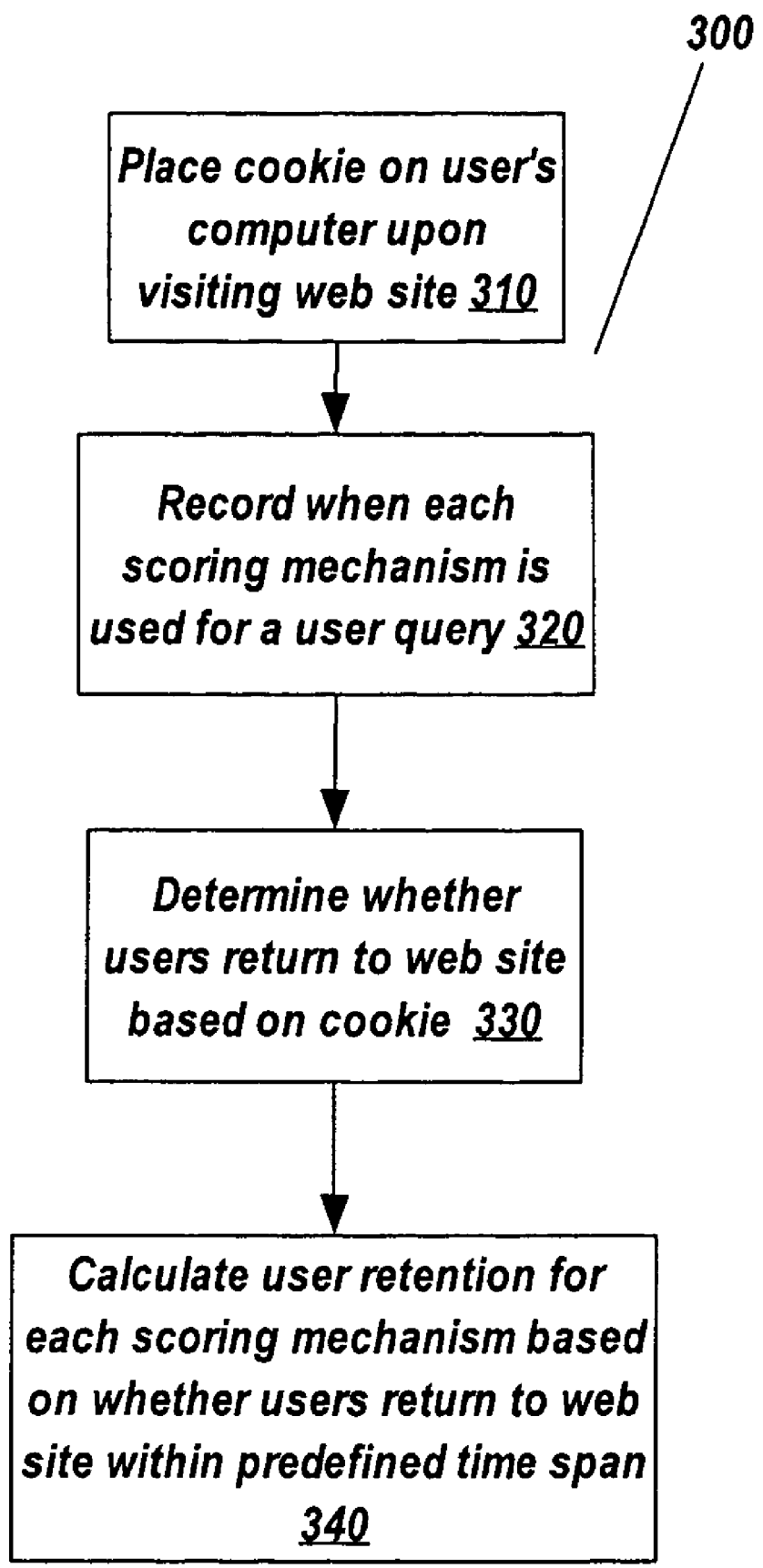
FIG. 3 is a flow diagram that illustrates a process for calculating user retention based on cookies.

FIG. 3 is a flow diagram that illustrates a process for calculating user retention based on cookies. When a user visits a website associated with a search mechanism, a cookie is placed on the user's computer (step 310). A browser cookie may be a string that is stored on a machine-readable medium associated with the user, a credential identifying the user, or any other appropriate identification mechanism. For example, when a user 110 visits a website associated with a search mechanism 130, a browser cookie is stored on the user's 110 computer.

Each selection for use of each scoring mechanism for each user is recorded in step 320. Generally, every selection for use of a particular scoring mechanism from among a plurality of scoring mechanisms for use on a query by the user 110 is recorded in the database 130. The use of the scoring mechanism is associated in the database 130 with the user 110 by recording it with respect to the browser cookie. The recordation may be accomplished in many ways, including adding a record to the log 150 for each selection for use of each scoring mechanism. For example, a record is made in a database 140 each time each particular user 110 has a particular scoring mechanism selected for use and, in this case, the user 110 is associated with the browser cookie.

In step 330, the cookie is used to determine whether a user has returned to a website associated with the search mechanism 130. Generally, a user's 110 return is determined based on existence on the user's 110 computer of a browser cookie (which was stored thereon in step 310). A user 110 will typically be one of multiple users 110 that use a search mechanism. Each user 110 will have a scoring mechanism selected for each query the user submits. All of these scoring mechanism selections and their timings are recorded as part of step 330.

The user retention parameter value is calculated for each scoring mechanism based on whether each user has returned to a website associated with the search mechanism within a predetermined period of time after having the particular scoring mechanism selected for use on one the user's 110 queries (step 340). The predefined period of time may be any appropriate amount of time including one day, two days, one week, two weeks, one month. For example, a user retention parameter value is calculated for a particular scoring mechanism based on the percentage of users 110 that have returned to a website associated with the search mechanism 130 within one week of having had the scoring mechanism selected for their use.

The process for calculating user retention based on cookies enables the generation of one of the possible parameter values to be used in selecting a scoring mechanism from among multiple candidate scoring mechanisms.

Determining User Retention Based on User History

Figure 4:
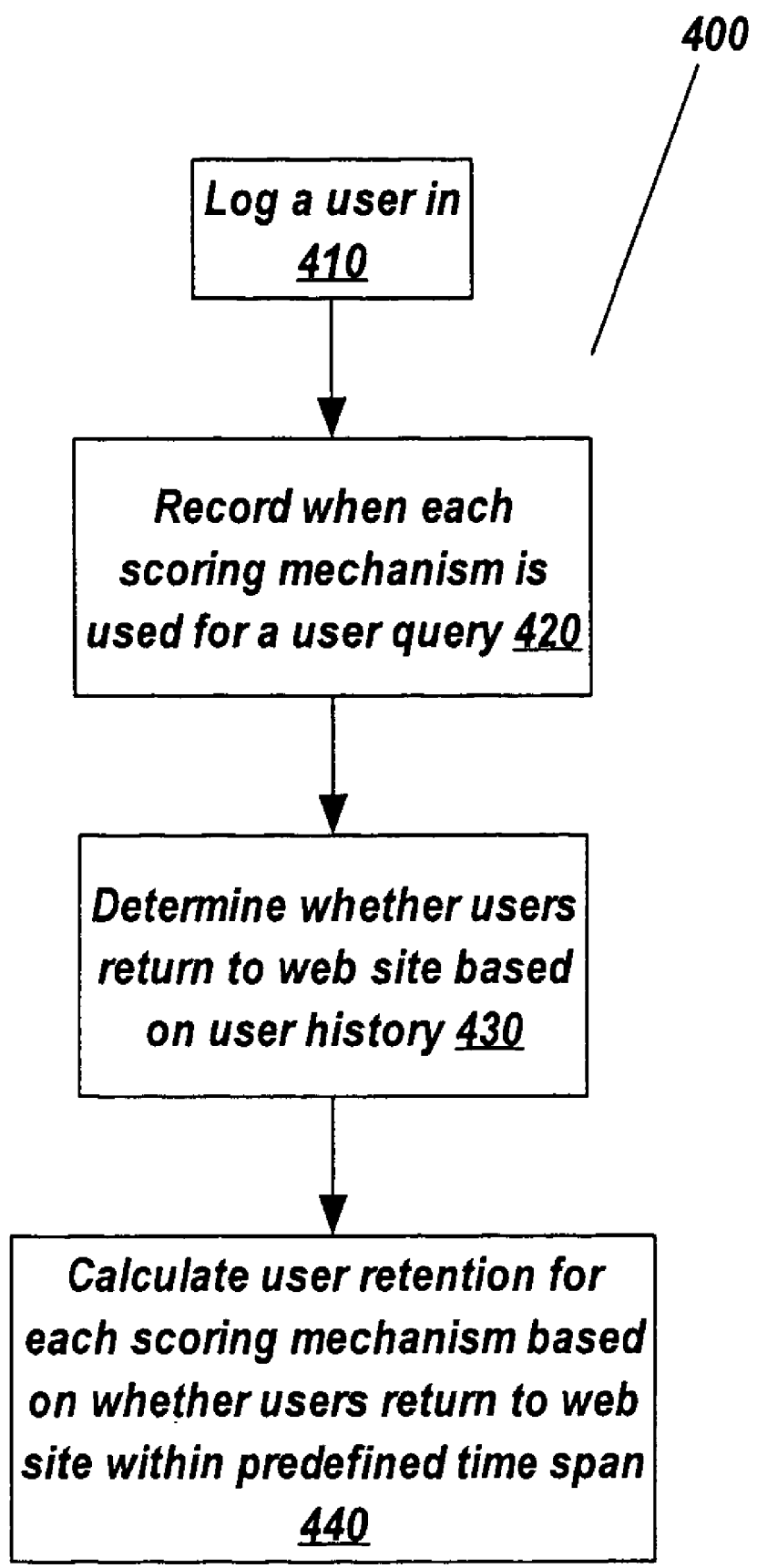
FIG. 4 is a flow diagram that illustrates a process for calculating user retention based on user history.

A second method of determining user retention utilizes history of users who have had selected for their use particular scoring mechanisms. FIG. 4 is a flow diagram that illustrates a process for calculating a user retention parameter value based on user history.

Referring to FIG. 4, users are logged into a web site associated with a search mechanism (step 410). Any appropriate method of logging in a user may be used, including having the user provide a user name and password, a credential stored, or other appropriate identification information. A user may also log in by typing a universal resource locator (URL) into a web browser. For example, a user 110 logs into a website associated with a search mechanism 130 using a user name and password. Alternatively, a user may log in by running a web service that communicatively couples the user to the search mechanism.

In step 420, each selection for use of each scoring mechanism for one or more users is recorded. Generally, every selection for use of a particular scoring mechanism from among a plurality of scoring mechanisms for use on a query by the user 110 is recorded in the database 130. The use of the scoring mechanism is associated in the database 130 with the user 110 by recording the use with respect to the identifier for the user 110. The identifier may be any appropriate identifier, such as email address and login ID. The recordation may be accomplished by adding a record to the log 150 for each selection for use of each scoring mechanism. For example, a record is made in a database 140 each time each particular user 110 has a particular scoring mechanism selected for use and the user 110 is identified by login ID.

The user history is used to determine whether a user has returned to a website associated with the search mechanism (step 430). User activity, as noted above may be stored in any appropriate location including the database 140, the log 150, or any other appropriate machine-readable medium communicatively coupled to the search mechanism 130. For example, in the context of FIG. 1, a search mechanism 130 determines that a user 110 has returned to a website associated with the search mechanism 130, based on the history for the user 110 stored in a database 140. A user 110 will typically be one of multiple users 110 that use a search mechanism. Each user 110 will have a scoring mechanism selected for each query the user submits. All of these scoring mechanism selected and their timings are recorded as part of step 430.

A user retention parameter value is calculated for each scoring mechanism based on whether each user has returned to a website associated with the search mechanism within a predetermined period of time after having the particular scoring mechanism selected for use on one the user's 110 queries (step 440). The period of time may be any appropriate time period such as one day, two days, one week, two weeks, or one month. For example, a user retention parameter value is calculated for each particular scoring mechanism based on the percentage of users 110 that have returned to a website associated with a search mechanism 130 within one day of using the particular scoring mechanism.

The process for calculating user retention based on user history enables the generation of one of the possible parameter values to be uses in selecting a scoring mechanism from among multiple candidate scoring mechanisms.

Hardware Overview

Figure 5:
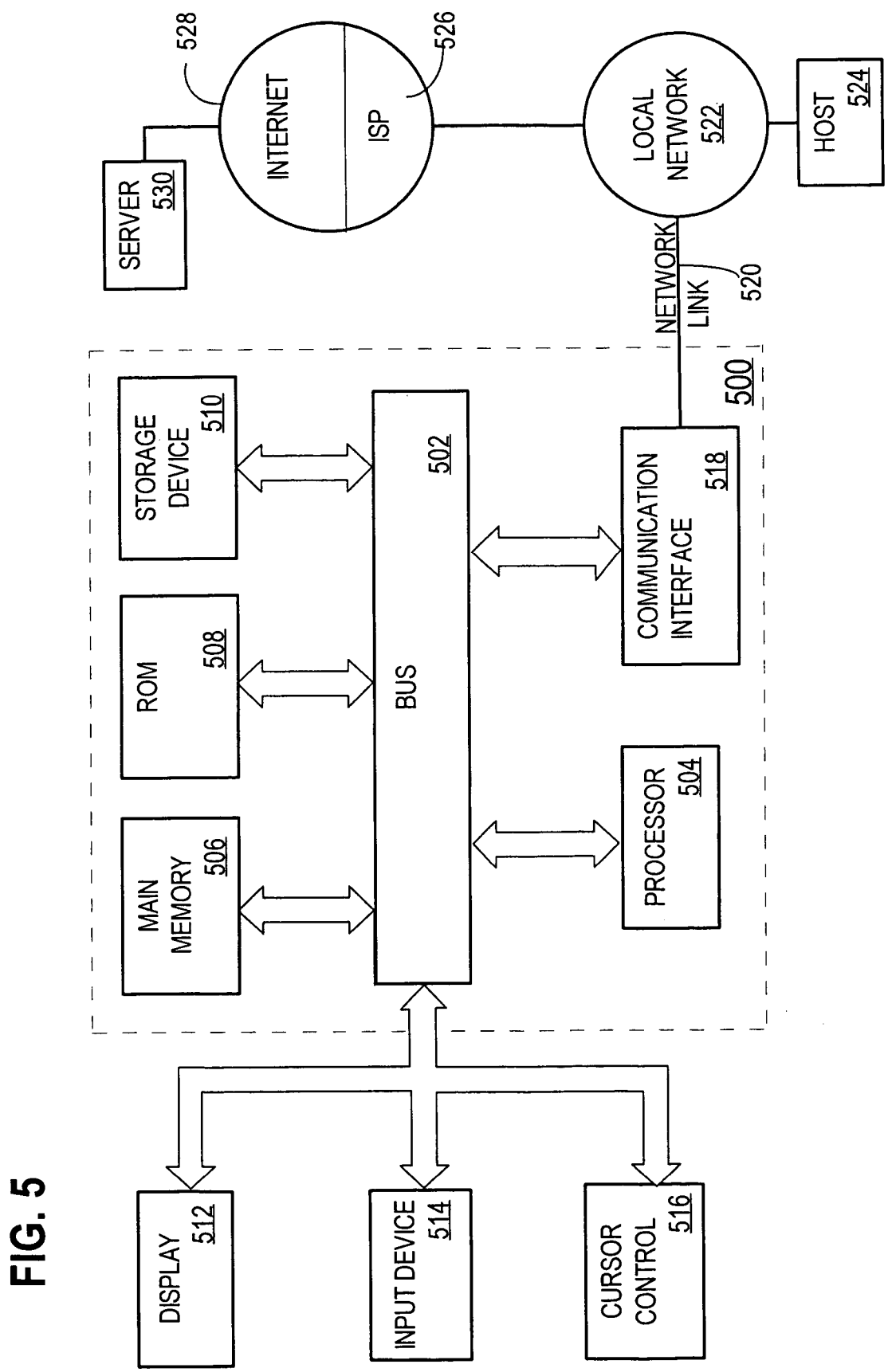
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media may also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer may read.

Various forms of machine-readable media may be involved in carrying one or more sequences of one or more instructions to processor 504 for execution. For example, the instructions may initially be carried on a magnetic disk of a remote computer. The remote computer may load the instructions into its dynamic memory and send the instructions over a telephone line using a modem. A modem local to computer system 500 may receive the data on the telephone line and use an infra-red transmitter to convert the data to an infra-red signal. An infra-red detector may receive the data carried in the infra-red signal and appropriate circuitry may place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 may send messages and receive data, including program code, through the network(s), network link 520 and communication interface 518. In the Internet example, a server 530 may transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for selecting a scoring mechanism from a plurality scoring mechanisms for processing queries, comprising the steps of:

for each scoring mechanism of said plurality of scoring mechanisms, determining, based on a query, multiple parameter values for the scoring mechanism, wherein each parameter value of said multiple parameter values indicates a different characteristic associated with using said scoring mechanism for processing said query;

for each scoring mechanism of said plurality of scoring mechanisms, generating a score based on the multiple parameter values determined for the scoring mechanism; and selecting which scoring mechanism to use to process said query based on the score generated for each scoring system;

wherein said query is a query received by a search mechanism and one of said multiple parameter values is a density of sponsored product items parameter value and the density of sponsored product items parameter value is determined based on a percentage of sponsored product items in a result set that would be generated for said query for each scoring mechanism of said plurality of scoring mechanisms, wherein a sponsored product item is a particular product item for which a party associated with the particular product item will or has been charged a fee for each inclusion of a reference to said particular product item in results provided by said search mechanism, and wherein a product item is selected from the group consisting of a merchant, a product offering, and a product abstraction.

2. The method of claim 1, wherein the multiple parameters values comprise a relevance parameter that reflects the relevance of results that would be produced by the scoring mechanism for said query, density of sponsored product items within results that would be produced by using the scoring mechanism to process said query, and a user retention parameter that estimates the likelihood that a user that issued said query will find the results useful.

3. A machine-readable storage medium storing one or more sequences of instructions which, when executed by one or more processors, causes the one or more processors to perform the method recited in claim 2.

4. The method of claim 1, wherein the multiple parameter values comprise a relevance parameter value and the relevance parameter value is determined for each scoring mechanism of said plurality of scoring mechanisms by having a human grade the results produced by each scoring mechanism for one or more sample queries.

5. A machine-readable storage medium storing one or more sequences of instructions which, when executed by one or more processors, causes the one or more processors to perform the method recited in claim 4.

6. The method of claim 1, further comprising the step of determining a relevance parameter value for each scoring mechanism for each category of a plurality of product item categories, wherein each product item category of the plurality of product item categories is selected from the group consisting of a product category, a merchant category, and a product abstraction category.

7. A machine-readable storage medium storing one or more sequences of instructions which, when executed by one or more processors, causes the one or more processors to perform the method recited in claim 6.

8. The method of claim 1, wherein one of the multiple parameter values is a density of sponsored product items parameter value and the density of sponsored product items parameter value is determined based on potential revenue that would be generated by using the result set that would be produced for said query by using each scoring mechanism of said plurality of scoring mechanisms.

9. A machine-readable storage medium storing one or more sequences of instructions which, when executed by one or more processors, causes the one or more processors to perform the method recited in claim 8.

10. The method of claim 1, wherein said query is a query received by a search mechanism and one of the multiple parameter values is a user retention parameter value generated for each scoring mechanism of said plurality of scoring mechanisms and the user retention parameter value is generated for the scoring mechanism based on a percentage of users that return to a website associated with said search mechanism within a predetermined time span after receiving results generated by the scoring mechanism.

11. A machine-readable storage medium storing one or more sequences of instructions which, when executed by one or more processors, causes the one or more processors to perform the method recited in claim 10.

12. The method of claim 1, wherein the step of selecting a scoring mechanism from said plurality of scoring mechanisms comprises performing a functional composition of the parameter values wherein the functional composition is selected from the group consisting of a product of parameter values and a product of squares of parameter values.

13. A machine-readable storage medium storing one or more sequences of instructions which, when executed by one or more processors, causes the one or more processors to perform the method recited in claim 12.

14. A machine-readable storage medium storing one or more sequences of instructions which, when executed by one or more processors, causes the one or more processors to perform the method recited in claim 1.

15. A method for selecting a scoring mechanism from a plurality scoring mechanisms for processing queries, comprising the steps of:

for each scoring mechanism of said plurality of scoring mechanisms, determining, based on a query, multiple parameter values for the scoring mechanism, wherein each parameter value of said multiple parameter values indicates a different characteristic associated with using said scoring mechanism for processing said query;

for each scoring mechanism of said plurality of scoring mechanisms, generating a score based on the multiple parameter values determined for the scoring mechanism; and selecting which scoring mechanism to use to process said query based on the score generated for each scoring system;

wherein said query is received by a search mechanism associated with a website, wherein the method further comprises the steps of:

placing a cookie on a user's computer;

recording for each scoring mechanism of the plurality of scoring mechanisms when the scoring mechanism is selected for use on a user query for the user;

determining whether the user has returned to the website based on whether the cookie is on the user's computer; and calculating a user retention parameter value for each scoring mechanism of said plurality of scoring mechanisms based on a percentage of users that have returned to the website within a predetermined time span after using the scoring mechanism, and wherein the user retention parameter value is one of the multiple parameter values.

16. A machine-readable storage medium storing one or more sequences of instructions which, when executed by one or more processors, causes the one or more processors to perform the method recited in claim 15.

17. A method for selecting a scoring mechanism from a plurality scoring mechanisms for processing queries, comprising the steps of:

for each scoring mechanism of said plurality of scoring mechanisms, determining, based on a query, multiple parameter values for the scoring mechanism, wherein each parameter value of said multiple parameter values indicates a different characteristic associated with using said scoring mechanism for processing said query;

for each scoring mechanism of said plurality of scoring mechanisms, generating a score based on the multiple parameter values determined for the scoring mechanism; and selecting which scoring mechanism to use to process said query based on the score generated for each scoring system;

wherein said query is received by a search mechanism associated with a website, wherein the method further comprises the steps of:

logging a user into a server;

recording for each scoring mechanism of the plurality of scoring mechanisms when the scoring mechanism is selected for use on a user query for the user;

determining whether the user has returned to the website based on a history for the user; and calculating a user retention parameter value for each scoring mechanism of said plurality of scoring mechanisms based on a percentage of users that have returned to the website within a predetermined time span after using the scoring mechanism, and wherein the user retention parameter value is one of the multiple parameter values.

18. A machine-readable storage medium storing one or more sequences of instructions which, when executed by one or more processors, causes the one or more processors to perform the method recited in claim 17.

* * * * *